Aug. 24, 1965    R. TAYLOR    3,202,278
ARTICLE PACKAGE AND METHOD OF MAKING THE SAME
Filed May 8, 1962    2 Sheets-Sheet 1
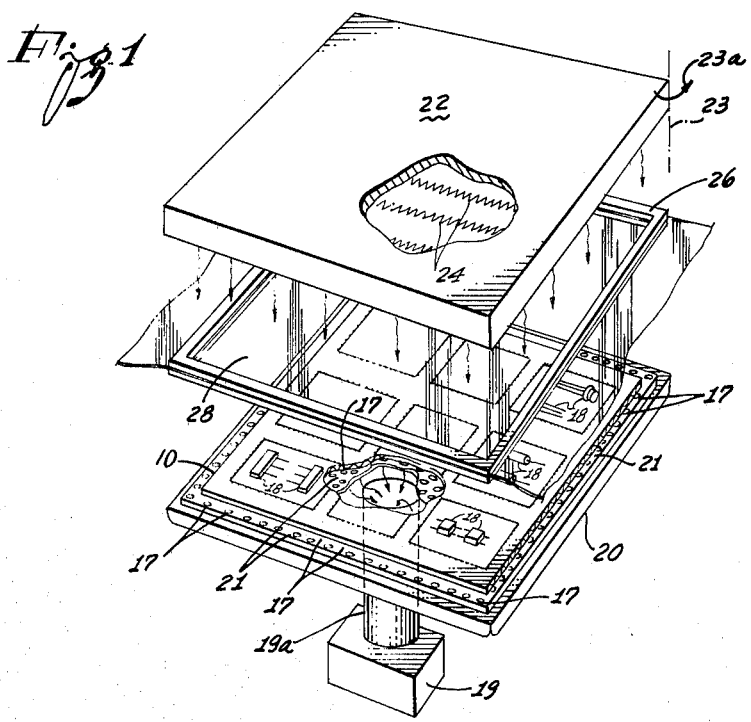
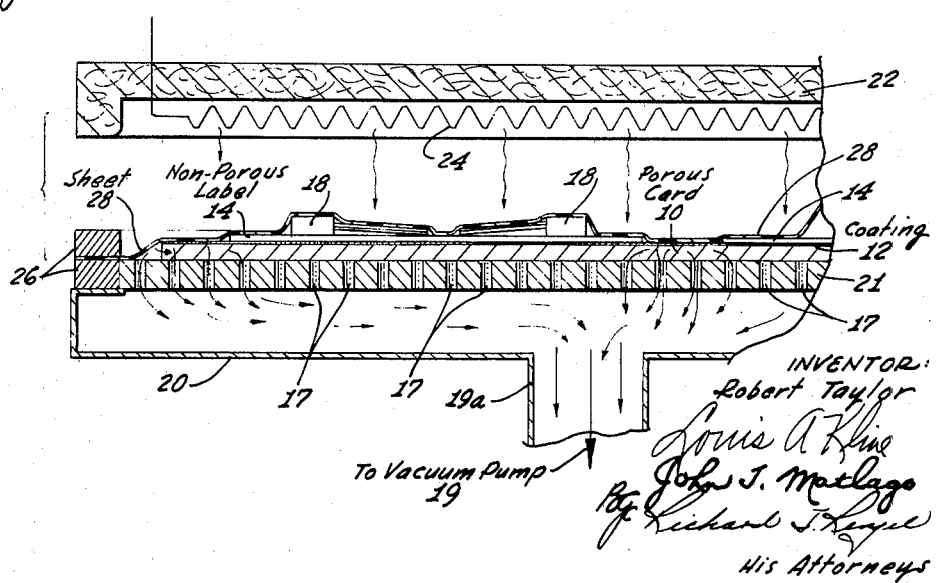
INVENTOR:
Robert Taylor Aug. 24, 1965  R. TAYLOR  3,202,278
ARTICLE PACKAGE AND METHOD OF MAKING THE SAME
Filed May 8, 1962  2 Sheets-Sheet 2

INVENTOR:
Robert Taylor

His Attorneys

United States Patent Office 3,202,278
Patented Aug. 24, 1965

3,202,278
ARTICLE PACKAGE AND METHOD OF
MAKING THE SAME
Robert Taylor, La Crescenta, Calif., assignor to The National Cash Register Company, Dayton, Ohio, a corporation of Maryland
Filed May 8, 1962, Ser. No. 193,275
8 Claims. (Cl. 206—80)

The present invention is directed to packages for articles and the method of making the same, and more particularly to packages for enclosing one or more articles to protectively seal and display such articles.

In the past, many and various types of packages for articles have been developed. The advantages of providing packages which both display and protect articles have brought various forms of apparatus and methods for packaging into common use. One type of display package is the so-called "skin package" wherein a thermoplastic sheet is vacuum-drawn to a relatively stiff backing material so as to protectively cover the articles placed on said backing material.

Some of the prior art methods of making a "skin package" are limited to the packaging of products that are materially hard or rigid since such methods have a tendency to distort soft articles or damage fragile articles due to the "pulling down" effect of the plastic sheet during the application of vacuum-drawing thereto. In one of the prior methods of packaging, preformed molded boxes or plastic bubbles of thick plastic material are placed over each article. This method has proven to be unsatisfactory since the force of the vacuum-drawing tends to collapse or distort the bubble or box, particularly when there is sufficient heat present to soften the material of the bubble or the box during the application of the vacuum. Packaging of this type therefore, is limited to articles that are materially hard or rigid, since soft or fragile products, which could be compressed or misshapened by the application of the thermoplastic sheet, could not satisfactorily be so packaged. Consequently, another prior art method was brought into use to package soft or fragile articles. This latter method required a slot opening in the backing of each package to provide for insertion of a die over the article to protect it from the force produced by the drawing of the thermoplastic sheet over the article in the packaging process. This die could be removed through the opening slot after the thermoplastic sheet was formed around the article. Insertion and removal of a die through an opening in the backing of the package involved extra operations. Furthermore, the resulting package had an opening therein and no longer protected the articles from contamination during storage or handling.

In order to avoid the foregoing disadvantages, a more recent development in the prior art is to employ an air-impervious backing material only, that is cut to the plan form of each article to be packaged. Using this approach each article is separately packaged by drawing a thermoplastic sheet over the article, trimming off the excess sheet material around the article, then turning over the article and drawing a second thermoplastic sheet over the impervious backing and again trimming the excess sheet material around the article. The number of steps involved in this latter method of packaging presents a great disadvantage, and although this method may present advantages in the end result for a particular type of article, it does not provide a method of packaging which is simple and economical whereby it can be used for packaging articles generally. Also, this method of packaging has the disadvantage in that several articles or groups of articles cannot be individually packaged on the same backing or card to facilitate inventory or orderly storage and handling.

The present invention provides an article package and the method of making the same in which the articles are mounted on an air-porous mounting card on which a relatively non-porous label or barrier is secured to the card to provide a protected enclosure area for the article. A thin thermoplastic sheet or film is heated and vacuum-drawn over the articles to form a transparent protective cover or skin extending over the articles and in shape-conforming relation therewith and laminated or fused to the mounting card so that, the articles, card, and labels are visible through the cover and are protected by the latter from contamination during storage or handling. The label, which is a barrier interposed between the articles, is secured to the mounting card to define the protected area of an enclosure for an article. The label or barrier is relatively non-porous, i.e., less air-porous than the mounting card, whereby the drawing-force of the vacuum is decreased in the protected area defined by the label to decrease the force which draws the thin sheet over the immediate area of each of the articles being packaged. Thus, fragile articles can be packaged without danger of breakage in the packaging process because less force is exerted on the articles in the packaging process.

In the preferred arrangement, the labels are impregnated or coated paper labels or plastic labels upon which the individual articles or groups of articles are placed and identified thereby. In addition to reducing the force applied to the articles during packaging, the labels also cover respective protected areas of a continuous thermo-active coating on the surface of the mounting card, whereby inherent connection or fusion between the thin thermoplastic sheet and the mounting card is prevented in these areas to facilitate removal of the articles later, when needed. In the preferred arrangement, a packaged article can be simply and easily removed from the package by cutting the thin thermoplastic sheet along, and inside the edge of the label under the article selected. Since the thermoplastic sheet does not adhere to the label, or adheres only slightly, and the article is not encapsulated; the portion of sheet that is cut away can be lifted away from the card to expose the selected article that is now lying free of the sheet on the mounting card.

The term thermoplastic sheet, is used herein to define those plastic sheets or films of materials that are formable and are adapted to take on a new and permanent configuration under the influence of heat and pressure.

The property of good resistanceto the transmission of water vapor, in addition to that of other gases, is of importance in the packaging of many articles. The materials found to be most useful for packaging in accordance with the present invention are included in the class of polymers having low moisture permeability. These materials include polyethylene, fluorinated ethylene polymers, polyisobutylene and vinylidene chloride copolymers with vinyl chloride, acrylonitrile, and isobutylene. Of this class of material, a poly(ethylene terephthalate) film or thin sheet has a combination of outstanding properties, i.e. high mechanical strength and greater impact strengths over a wide range of temperatures and humidities. Further, its moisture absorption is very low, about 0.3 percent, and it has good resistance to most of the other chemicals including common varnishes and impregnants. A sheet of poly(ethylene terephthalate) does not become adhesive when heated to the range of temperatures (150° to 180° F.) produced in the packaging process. Therefore, in the alternate arrangement of the present invention, a thin sheet of poly (ethylene terephthalate) is coated with polyethylene to produce adhesion or fusion with other surfaces. This coated sheet is preferably .002 inch in thickness and can vary from .0005 to .004 inch in thickness. However, the first polymer in the above list of materials, i.e., polyethylene, is far less expensive than the other materials referred to above. Since polyethylene is well suited to the present packaging process, it is the preferred material for use except for special packaging when poly(ethylene terephthalate) or other materials having additional properties are required.

A further and very important advantage of the present invention is the provision for reducing the force of the vacuum-drawing of the thin sheet of thermoplastic material over the articles in the protected areas defined by barriers or labels. These labels are of any desired shape to define protected areas and enclosures of corresponding desired shapes, e.g. rectangular, elliptical or circular. In order to provide adequate binding or adherence between thethermoplastic sheet and the mounting card, the drawing force on portions of the sheet above the articles must be reduced. It is evident from the packaging methods of the prior art that when the drawing force cannot be properly controlled, the thermoplastic sheet may be drawn against the article with such force as to distort soft articles and damage fragile articles. Whether or not the article is hard or rigid, soft or fragile, the unrestricted vacuum-drawing force about the article often tends to cause the heated thermoplastic sheet to be drawn to the article with such force so as to fuse to areas of the article. When the article is not resting flat against the mounting card or there are openings in the article, or portions of the article are not resting against the mounting card, the "pulling" effect on the thermoplastic sheet, due to the vacuum-drawing, will cause the sheet to be wrapped around or encapsulate these portions of the article, often fusing to itself, making it difficult or impossible to remove the article from the sheet for use. If the articles are fragile, but can withstand the vacuum-drawing force, then such encapsulation by the thermoplastic sheet will most likely cause damage to the article in the difficult process of removing it from the sheet. These disadvantages of "skin packaging" as practiced heretofore, have drastically limited its use, particularly for packaging electronic components. Small electronic components, such as crystal diodes, transistors, or resistors, become so encapsulated in the thermoplastic sheet that they cannot be removed without great difficulty and possible damaging thereof.

An advantage, therefore, of the present invention is the packaging of electronic parts or components, particularly small spare parts, for computer systems in which a large assortment of electronic components of many sizes and shapes are to be packaged separately and identified. Packaging spare parts therefore, requires the capability of packaging parts of varying size. Many of the parts require a very small area of a mounting card, some parts require the entire area of the card while other parts require greater or lesser areas of the card. The size of a standard or uniform card, therefore, is determined by the largest electronic part to be packaged and the width and height of the drawers of a filing cabinet in which the packages are to be filed whereby a standard size card is provided upon which many small parts or a lesser number of larger parts can be packaged.

Accordingly, it is an object of the present invention to provide an improved package for articles having the foregoing features and advantages.

Another object is to provide a package for mounting articles whereby the articles are visible and easily identifiable and are also protected from contamination.

A further object is to provide a packaging method in which protected areas for articles on a mounting card are defined by portions of barrier material which reduce the drawing force of a thermoplastic sheet that is drawn over the articles and laminated to the mounting card.

Still another object is to provide a method of packaging in which a thermoplastic sheet covers and fixes the position of articles located in protected areas of a mounting card without damaging or encapsulating the articles in the enclosure.

It is a further object of this invention to provide a package for protecting and maintaining articles positioned on a mounting card by a thermoplastic sheet which is drawn over the mounting card and the articles wherein the vacuum-drawing force exerted in the area of the articles in the packaging process is reduced to prevent damage or encapsulation thereof without the need of inserting and removing dies, tools, etc. into the package. Another object of this invention is to provide a method of packaging in which an article being packaged shapes a thermoplastic sheet which engages the article without damaging the article in the packaging process or encapsulating the article in said sheet.

Still another object of this invention is to provide a method of packaging which is not dependent on the size or shape of the article to be packaged while protecting the article from forces due to the vacuum-drawing of a thermoplastic sheet in the process of fusing the thermoplastic sheet to the mounting card thereby preventing encapsulation of the article which would make removal of the article from the package difficult.

Another object is to provide means for retaining an article in a predetermined location on a mounting card prior to and during a packaging process in which a thermoplastic sheet is drawn over the article and attached to the card.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a diagrammatic illustration of typical apparatus for practicing the method of making the packages of the present invention.

FIG. 2 is a diagrammatic showing of a portion of the packaging apparatus and package of the present invention for illustrating the flow of air during the formation of a package by the apparatus shown in FIG. 1.

FIG. 6b shows the reverse side of the replacement package shown in FIG. 6a.

Figure 3:
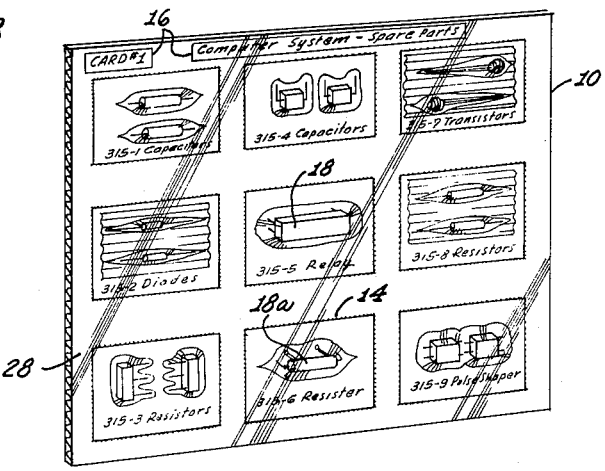
FIG. 3 is a perspective view of a typical package produced by the method of the present invention.

Referring to FIG. 1, apparatus is shown therein for packaging articles under a thin, transparent thermoplastic sheet 28 in accordance with the method of packaging of the present invention. The packaging apparatus, as also shown in FIG. 2, includes a chamber 20 connected to a vacuum pump 19 by a suction pipe 19a for drawing air through a perforated metal plate 21. The plate 21 forms the top section of the chamber 20 and has small openings 17 through which air is drawn into the chamber 20 and to the vacuum pump 19 through the pipe 19a. The air drawn through the small openings 17 and an air-porous mounting card 10 disposed thereon, creates a large pressure differential on opposite sides of the thin thermoplastic sheet 28 when the sheet 28 is lowered down on the card 10 as shown in FIG. 2. The force of the vacuum-drawing causes the sheet 28 to be drawn into firm engagement with the card 10 and into form conforming relation with articles 18 that are placed on the card 10 for packaging.

Prior to vacuum-drawing of the sheet 28 to the card 10, the sheet 28 is held in a position parallel to the plate 21 and card 10, as illustrated in FIG. 1, by a frame 26 including a pair of upper and lower rectangular frame sections which are opened, e.g., by suitable hinges (not shown), to receive the thin sheet 28, and are closed to secure this sheet in the position as shown. While the sheet 28 is held in this position above the card 10, a heater 22, including a heater element 24, produces a uniform distribution of heat over the entire section of the sheet 28 that is enclosed within the area of the frame 26. As schematically indicated in FIG. 1, by the arrow 23a, the heater 22 may be rotated about a vertical axis 23 to provide complete access to the frame 26 for placing the sheet 28 therein prior to heating.

The sheet 28, when activated by heat, becomes stretchable, pliable and elastic, and will firmly engage, adhere slightly, firmly adhere, or fuse to a surface, depending upon the force of vacuum-drawing on the sheet 28 at the particular area of the surface and the composition of the surface. For example, the composition of a thermoactive coating 12 on the card 10 and the sheet 28 is such that the coating and sheet will fuse when activated by heating and drawn together, whereas the surface of a paper label 14 and the sheet 28 will firmly engage but will not fuse. After the sheet 28 is heat-activated, the frame 26 is lowered by means not shown, to engage the periphery of the plate 21, as shown in part in FIG. 2, whereby the area of contact of the periphery of plate 21 with the frame 26 is substantially air-tight. Having lowered the frame, the vacuum pump 19 is operated to vacuum-draw the sheet 28 to firmly engage and thereby fuse to the exposed coated areas of the card 10 that are not covered by labels 14, and to firmly engage the labels 14 and articles 18 disposed thereon in a shape conforming manner.

In FIG. 2, the flow of air resulting from vacuum-drawing in the packaging process is shown schematically to illustrate the effect provided by the non-porous labels 14 in reducing the force of the vacuum-drawing on portions of the sheet 28 which portions are opposite the protected area of the labels 14 on which the articles 18 are positioned. It will be noted that the thermoplastic sheet 28 does permit some flow of air therethrough when subjected to the force of vacuum-drawing. Although the illustration in FIG. 2 does not show a flow of air through the labels 14, it should be understood that the illustration is intended to emphasize the feature of reducing the air flow and force of vacuum-drawing in the protected areas defined by the labels. In practice, the paper labels 14 are non-porous to the extent of being substantially less porous than the porous card 10. Thus, the paper labels 14 restrict the flow of air therethrough to the extent of reducing the force of vacuum-drawing on respective opposing areas of the sheet 28 to prevent the articles 18 located on the labels 14 from being damaged and preventing the thermoplastic sheet 28 from encapsulating the articles 18. The composition of the labels 14 and/or the surfaces of the labels 14 is such that it inhibits adhesion of the activated sheet 28 to the labels 14 except as described later in a particular embodiment in which it is desired to fuse the sheet 28 to marginal areas of plastic labels.

Figure 5:
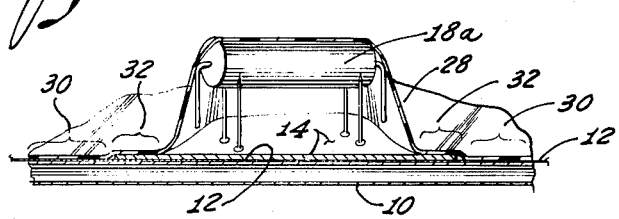
FIG. 5 is an enlarged sectional view for illustrating the details of a portion of the package of the present invention which is shown in FIG. 3.

A thermoplastic sheet 28 comprising a thin film of polyethylene, i.e., a thermoplastic polymer of ethylene will fuse with the exposed upper surface of the card 10 having a thin thermoactive adhesive coating 12 as shown in section in FIG. 5. The coating 12 is activated to become adhesive by the heat produced during the heating of the sheet 28 and/or as a result of the heating produced upon engagement with heated sheet 28. The thin thermoactive coating 12 comprises, for example, a polyethylene base resin which is a thermoactive adhesive coating material that is applied by forming a water emulsion and extruding the same onto the card 10 to provide a thin continuous layer .1 to .2 mil (.0001 to .0002 inch) in thickness on the mounting card 10. A thermoactive adhesive of this type, known as product #5L–208, is supplied by Union Carbide Corp., New York City, New York. A card 10 having a thin coating of this material is air-porous and need not be perforated to be suitable for use in the packaging process.

The sheet 28 can vary in thickness from .5 mil (.0005 inch) to 20 mils (.020 inch). A sheet 28 having a thickness of 6 mils (.006 inch) has been found to be well adapted to hold small, light articles 18 which comprises the majority of electronic components; however, when the articles are larger and/or heavier, e.g., transformers, a heavy sheet 28 having a thickness of 10 mils (.010 inch) is preferable. However, two or more sheets 28 each of which is 6 mils (.006 inch) in thickness can be used to package heavy articles instead of a heavier sheet 28, and the plurality of sheets can be applied in one operation, if desired. Also, when the articles 18 to be packaged have sharp edges or points which project toward the sheet 28, a heavy strip of plastic (not shown) is laid across these articles and attached thereto prior to vacuum-drawing of the sheet 28 to prevent piercing, cutting or breaking of the sheet 28 in the packaging process. This heavy strip provides an additional protection to the sheet 28 during packaging and handling.

Figure 4:
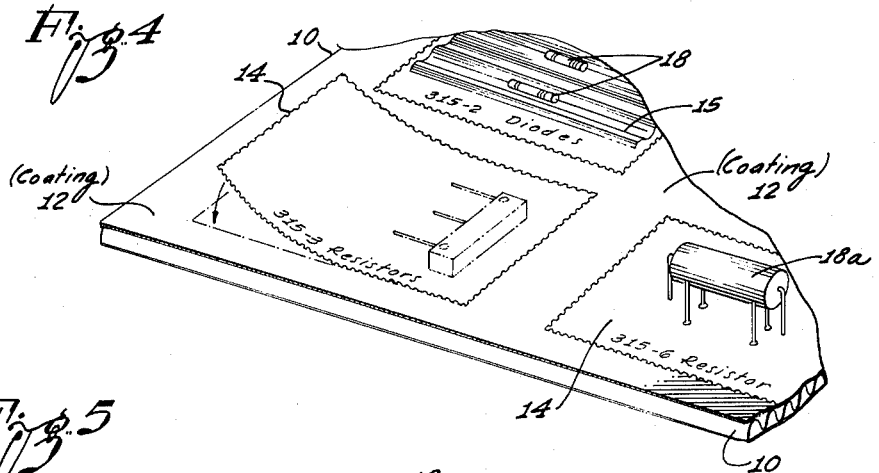
FIG. 4 is a perspective view of a portion of the package of the present invention for illustrating the structure thereof prior to applying a thermoplastic sheet thereto in the packaging process.

Referring now to FIGS. 3 to 5, the package of the present invention is shown to comprise a mounting card 10 having a thin thermoactive adhesive coating 12 and labels 14 which define protected areas of the mounting card 10 for mounting the articles identified by the indicia printed, typed or otherwise placed on the labels 14. Additional labels 16 only serve to identify the mounting card 10. The mounting card 10 is relatively stiff to provide a suitable support for the articles mounted thereon, e.g., a corrugated board, as shown. The extent of the air-porosity of the coated mounting card 10 is such that by application of suction to the back surface, e.g. by the apparatus as shown in FIG. 1, the air between the sheet 28 and the mounting card 10 is evacuated causing the sheet 28 to firmly engage and fuse with the exposed thermoactive adhesive coating 12 on the card 10 that surrounds the labels 14. As noted previously, the mounting card 10 is coated on the upper surface with a thin thermoactive adhesive coating 12 in such a manner that the coated mounting card 10 remains porous in order to allow the passage of air therethrough. However, the card 10 can be perforated to produce greater air-porosity, although this is unnecessary for the packaging process of the present invention. Also, the particular thermoactive adhesive material used to provide the thermoactive coating 12 depends on the particular material forming the thermoplastic sheet 28 so that the sheet 28, when activated by heat, fuses with the coated card 10 upon engagement therewith in the packaging process. For example, when the sheet 28 is vinyl instead of polyethylene, a vinyl thermoactive adhesive coating is placed on the card 10 instead of the polyethylene base, adhesive coating 12. If the coated card 10 is non-porous as a result of the coating, or otherwise, it can be perforated to enable it to be used in the packaging process of the present invention.

In order to interrupt or substantially reduce the flow of air through the mounting card 10 in the areas of the articles 18, such as electronic spare parts, the labels 14 reduce the drawing force on the thermoplastic sheet in these respective areas as illustrated in FIG. 2. The labels 14 are relatively non-porous and may consist of relatively non-porous paper on which the name and the part number are placed to identify the respective spare parts. The surface of this paper comprises a coating of plastic, clay, asbestos or other suitable materials which will not fuse with the sheet 28 in the process of packaging. It is desirable to have the thermoplastic sheet 28 firmly engage or cling to the label without fusing or sealing to it to facilitate removal of the articles 18 at a later time. Therefore, the surfacing of the label 14 is such that no fusion will occur but due to firm engagement of the label 14 and the sheet 28, a seal will be produced around the article 18 placed on the label 14.

In FIGS. 3 and 4, an article positioning member is shown which consists of corrugated paper 15. By placing articles 18, such as diodes as shown, in the grooves of the corrugated paper 15, the diodes are retained in spaced relationship and thereby prevented from movement from their desired locations during handling prior to packaging and during the packaging process. Also, the corrugated paper 15 serves to inhibit encapsulation of the articles placed thereon by the protection afforded by adjacent raised portions of the corrugated paper extending along both sides of each of the articles as shown. Thus by providing an irregular surface in the areas in which the articles are to be placed on the card 10, the irregular surface inhibits movement of the articles prior to and during the packaging process.

Polyethylene is known to provide a moisture barrier. However, some other plastic materials provide a better moisture barrier and have additional properties which will make these materials more suitable for practicing the present invention when these additional properties are needed or desired. For example, a polyethylene coated sheet 28 of poly(ethylene terephthalate) can be used instead of a sheet of polyethylene material. When using a coated poly(ethylene terephthalate) sheet 28, polyethylene coated poly(ethylene terephthalate) labels 14 are placed upon the surface of the air-porous mounting card 10 instead of paper labels. When using coated poly(ethylene terephthalate) material, the polyethylene coated surfaces of the sheet 28 and labels 14 should be in opposing relation in the packaging process so that the opposing polyethylene coatings will fuse. For example, the marginal area 32 of the label 14 (FIG. 5) will fuse to the sheet 28 due to the application of heat and vacuum-drawing whereby a completely sealed and more highly moisture-resistant enclosure is formed around the resistor 18a.

Some of the advantages provided by the preferred method of packaging of the present invention are made more clearly apparent by the illustration of FIG. 5. The mounting card 10 is shown supporting a resistor 18a which is a type of resistor often referred to as a "standoff" resistor. The reduced force of the vacuum-drawing of the air in the protected areas defined by a paper label 14, placed on the porous mounting card 10, will cause the thermoplastic sheet 28 to be drawn over the resistor 18a thereby firmly holding the resistor 18a in position on the card 10. In the marginal area 32 of the paper label 14, the thermoplastic sheet 28 will firmly engage the label 14 but will not fuse to the label except when a polyethylene coated label is used as noted previously. In exposed coated areas 30 of the card 10, which are the areas that are not covered by labels 14 or 16, the thermoactive adhesive coating 12 on the card 10 provides for fusing of the sheet 28 with the surface of the car 10.

In general, the foregoing package and method of making the same provides for supporting articles 18 on a mounting card 10 which will permit visible inspection thereof, while enclosing the articles 18 in separate, individually sealed enclosures, as shown in FIG. 3. An important feature is that the package does provide for the control of the evacuation of air between the thermoplastic sheet 28 and predetermined protected areas in which the labels 14 are located whereby the force exerted on the articles 18 does not damage the articles in the packaging process, and complete encapsulation or wraparound of the articles 18 or portions thereof by the sheet 28 are prevented so as to facilitate removal of the articles from the package. The present method has the advantage of allowing for the placement of many groups of one or more articles or spare parts 18 on a single corrugated board. Thus, inventory of the articles 18 on many cards 10 is easily controlled while the packages provide the protection desired. The articles 18, which have been shown as electronic spare parts, are spare parts for a computer or data processing system. Many of these cards 10 are assembled to provide easy access to the multitude of spare parts required for servicing such a computer system. These cards 10 are filed in filing drawer cabinets having opposing vertical slots or channels in the sides of each file drawer wherein a pair of opposing channels receive the side edges of a respective card 10 to hold it in a vertical position and adjacent cards 10 are spaced so that the label 16 located near the upper edges of each of the cards is visible between adjacent cards. When a spare part 18 is needed, the package in which the part is contained is withdrawn from the proper file drawer. Since each part 18, or group of parts 18, is identified by the respective label 14, the desired spare part can be removed without disturbing other sealed enclosures on the same card 10.

Figure 6A:
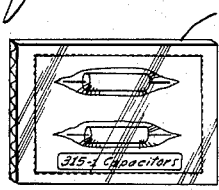
FIG. 6a shows a replacement package containing articles for replacing corresponding articles taken for use from the package shown in FIG. 3 in accordance with the present invention.
Figure 6B:
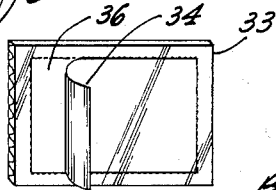

Upon withdrawing of spare parts 18 from the package, the spare parts removed can be replaced in anticipation of further need and to maintain a complete set of spare parts available for servicing a computer. To this end, individual spare parts 18 are replaced without the need of replacing an entire card 10 to make a set of spare parts complete. In FIGS. 6a and 6b, a sealed replacement package 33 containing spare parts 18 is shown which replaces the respective spare parts removed from a card 10 without the need for replacing the entire card. This replacement package 33 is secured to the mounting card 10 by removing an adhesive cover 34 exposing one side of an adhesive backing 36 and placing the replacement package 33 in the area of the parts 18 being replaced on the card 10. In this manner, the spare parts 18 are replenished to maintain a complete set of spare parts for a computer system.

What has been described is considered to be illustrative of the embodiment of the present invention and it is to be understood that various and numerous other arrangements thereof may be devised by one skilled in the art without departing from the spirit and scope of this invention.

What is claimed is:

1. The method of packaging articles which method comprises: placing a barrier of relatively non-porous and flat material over an area of a surface of an air-porous mounting card having a thermoactive adhesive coating wherein said barrier material provides a protected area on said card for locating an article having a plan form area substantially smaller than said barrier and protected area; positioning said article on said barrier and inside said protected area; placing said card and artcile disposed thereon in proximity to a source of vacuum; placing a sheet of light-transmissive thermoplastic material over said card and article disposed on said barrier; heating said sheet material to an activated condition in which said sheet material is capable of adhering to the coated surface of said mounting card; and vacuum-drawing the activated sheet to said air-porous mounting card and over said article to cause said sheet material to project away from the outer and upward surfaces of said article and to firmly adhere to said mounting card except in said protected area to form a light-transmissive enclosure for said article wherein the periphery of the enclosure is substantially larger than the plan form of said article to prevent encapsulation of the article by said sheet.

2. The method of packaging articles which method comprises: applying a non-porous label to a porous mounting card having a thermoactive adhesive coating, said label having indicia thereon for identifying an article and defining a protected area surrounded by an exposed area of the porous mounting card having said coating; placing the proper article of smaller area than said protected area to provide a protected area surrounding said article on said label; extending a thermoplastic sheet over said article and said porous mounting card, said sheet being capable of fusing to the exposed coated surface of said mounting card when activated by heating; heating said sheet to activate the same; and vacuum-drawing said activated sheet to said exposed area of said coated mounting card to cause said sheet to fuse to said exposed area of said mounting card and be drawn over said article in a form conforming relation thereto without adhering to the side surfaces of said article, to maintain said article positioned in the protected area, whereby a peripherally sealed enclosure larger than said article is formed about said protected area and said article.

3. A package for articles comprising: a mounting card comprising relatively stiff, and uniformly air-porous material; a layer of relatively non-porous barrier material on one surface of said mounting card, said layer of barrier material covering a larger portion of the surface of said card than the plan form area of an article to be packaged thereon to substantially reduce the air-porosity of the covered portion; and a thermoplastic cover sheet vacuum-drawn over said article and to said card, said cover sheet being drawn tightly against the uppermost surfaces of said article to secure the article in position on said barrier material and away from the side surfaces of the article and to the periphery of said barrier material to adhere to the remaining uncovered portions of said surface of said card about said barrier material whereby an enclosure is formed for said article.

4. The package for articles according to claim 3 in which said barrier material includes an irregular surface for inhibiting movement of the article placed in said area.

5. The package for articles according to claim 3 in which the barrier material comprises a sheet of thermoplastic material fused to said cover sheet whereby said article is sealed in and enclosed on all sides by sheets of thermoplastic material.

6. The package for articles according to claim 5 in which said cover sheet and barrier material comprise polyethylene coated material having a low moisture absorption rate.

7. A package for mounting and displaying articles comprising: a backing of uniformly air-porous corrugated material having a thermoactive adhesive coating; a plurality of labels having a nonadhesive side and an adhesive side secured to said backing to cover said coating and thereby provide a plurality of article enclosure areas on said backing wherein the labels are larger in area than the plan form area of respective articles disposed thereon and the labels substantially reduce the air-porosity of said article enclosure areas; a plurality of said articles disposed on said labels and identified by indicia on said labels; a light-transmissive thermoplastic film which has been heated to an adhesive and elastic condition and vacuum-drawn over said labels and articles and to said backing to adhere to exposed coated areas of said backing to produce a plurality of peripherally sealed enclosures defined by said labels whereby the articles identified by said labels are mounted and protectively displayed on said backing.

8. A replacement sealed packaged for replacing one or more articles removed from one of a plurality of sealed enclosures previously formed on a sheet of porous backing material of a package assembly, said replacement sealed package comprising: a mounting card comprising a section of uniformly air-porous material, a layer of relatively non-porous barrier material on said mounting card, said layer of barrier material covering a larger portion of the surface of said card than the plan form area of an article to be packaged to substantially reduce the air-porosity of the covered portion; a thin plastic cover sheet vacuum-drawn over said article, said barrier material and said card, said cover sheet being drawn firmly against the uppermost surfaces of said article and away from the side surfaces thereof to extend across the surface of said barrier material to adhere to the uncovered peripheral portions of said surface of said card to provide a sealed enclosure on said card; and an adhesive coating on the back surface of said mounting card for securing said replacement sealed package to said sheet of backing material of the packaging assembly from which the corresponding one or more articles have been removed.

References Cited by the Examiner

UNITED STATES PATENTS

| | | |
|---|---|---|
| 2,529,060 | 11/50 | Trillich. |
| 2,855,735 | 10/58 | Groth _____ 53—22 |
| 2,861,404 | 11/58 | Stratton. |
| 2,921,673 | 1/60 | Ryan _____ 206—45.31 |
| 2,984,056 | 5/61 | Scholl _____ 206—80 |
| 3,011,629 | 12/61 | Rohdin _____ 206—45.31 |
| 3,024,579 | 3/62 | Stockhausen et al. _____ 53—22 |
| 3,071,905 | 1/63 | Morse. |

FOREIGN PATENTS

| | | |
|---|---|---|
| 453,260 | 9/36 | Great Britain. |
| 680,632 | 10/52 | Great Britain. |
| 784,503 | 10/57 | Great Britain. |

OTHER REFERENCES

Modern Packaging of 12/56, pages 108–109.
Modern Packaging Encyclopedia—Alathon—vol. 32—1959, page 75.

THERON E. CONDON, *Primary Examiner.*
EARLE J. DRUMMOND, GEORGE O. RALSTON, *Examiners.*